Nov. 15, 1938.　　　　　　J. B. WATT　　　　　2,137,120
PROCESS FOR DRAWING SHEET GLASS
Filed Dec. 12, 1936　　　　2 Sheets-Sheet 1

INVENTOR
JAMES B. WATT
BY
Bradley & Bee
ATTORNEYS.

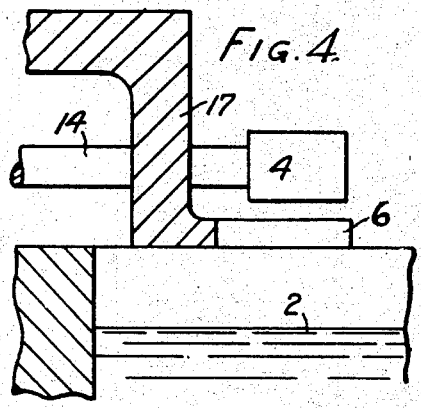
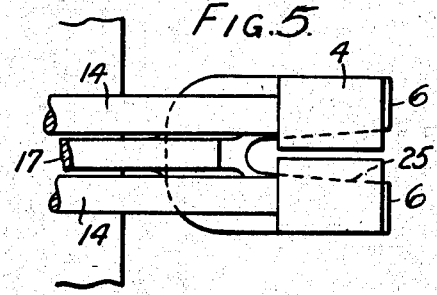
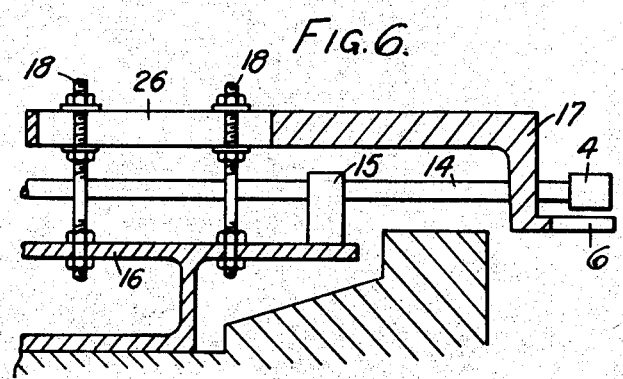
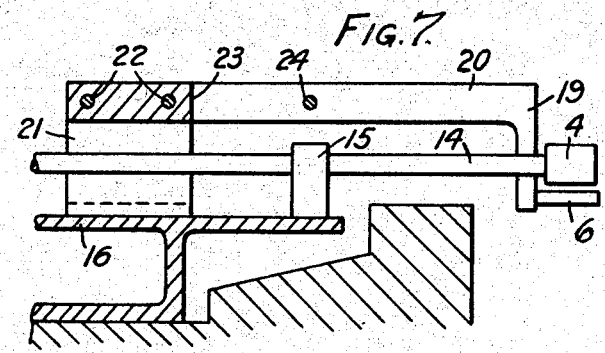
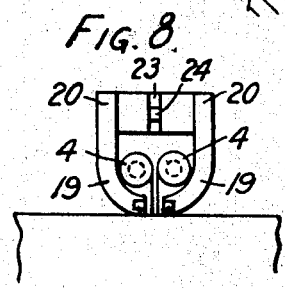
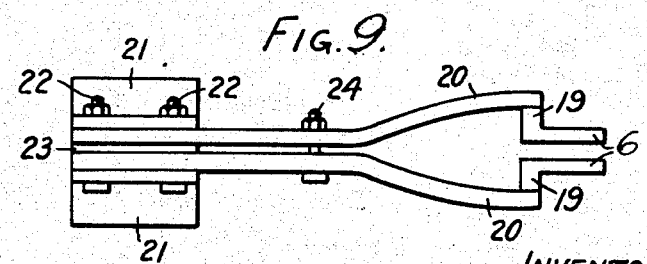

Patented Nov. 15, 1938

2,137,120

UNITED STATES PATENT OFFICE 2,137,120

PROCESS FOR DRAWING SHEET GLASS

James Bonar Watt, St. Helens, England, assignor to Pittsburgh Plate Glass Company, Pittsburgh, Pa., a company of Pennsylvania Application December 12, 1936, Serial No. 115,547
In Great Britain December 18, 1935

1 Claim. (Cl. 49—83.1)

This invention relates to a process for drawing flat glass in which the width of the sheet is maintained by rollers, as in the Colburn type of apparatus, and has for its object an improvement therein whereby the glass in the neighbourhood of the edges is of more uniform thickness.

In drawing sheet glass in the type of apparatus mentioned, it is customary to bend the drawn strip over a roller and anneal it in a horizontal lehr. The action of the width-maintaining rollers, however, produces variations in thickness in the neighbourhood of the edges such that it cannot be annealed without risk of breakage in an ordinary vertical tower of the type used in the Fourcault process.

According to the invention, a pair of members located below the rollers at each edge, engage the glass rising from the bath so as to determine the thickness of the glass mass reaching the rollers. The pair of members are preferably the prongs of a fork located so that the edge portion of the rising glass passes between them. Preferably means are provided for adjusting the effective width of the space between the two members of each pair, to control the thickness of the glass reaching the rollers.

Figure 1:
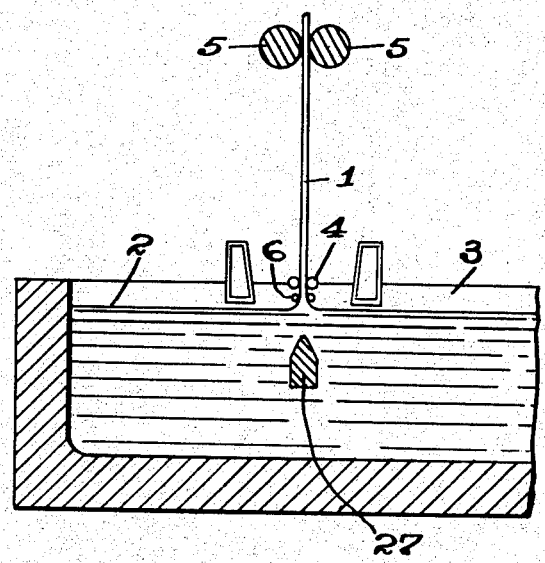
Figure 2:
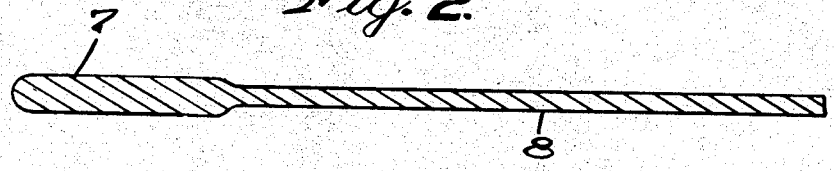
Figure 3:
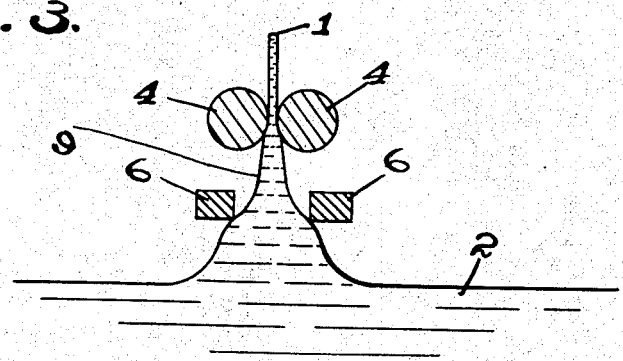

In the accompanying drawings, Figure 1 is a central vertical section of a drawing apparatus, in which details are omitted. Fig. 2 is a section through one edge of the sheet produced. Fig. 3 is a diagrammatic vertical section at the base of the glass sheet, such section being taken through the width-maintaining rollers and the edge retarding members. Fig. 4 is a central vertical section showing the operative ends of one roller and the said member. Fig. 5 is a plan view of the same. Fig. 6 is a section similar to that of Fig. 4 on a reduced scale showing further parts of the apparatus. Fig. 7 is a section similar to that of Fig. 6 showing an alternative form of member. Fig. 8 is an end view thereof. And Fig. 9 is a plan view of the members.

Referring to Fig. 1, the sheet 1 is drawn from the bath of molten glass 2 contained in the forehearth of the furnace. The width of the sheet is maintained by rollers 4. The rollers 5 are the first rollers drawing the strip upwards into a vertical annealing tower. The members which form the subject of the invention are represented by the parts 6. The remaining portions of the figure represent a drawing apparatus of ordinary type and therefore need not be further described.

In order to understand the result secured by the use of the parts 6, 6 in conjunction with the edge maintaining rolls 4, 4 of the prior art, it is necessary to consider the edge conditions produced when edge maintaining rollers are used alone and when fixed members, such as the parts 6, 6 are used alone. Either of such edge holding means will prevent the sheet edges from working away from the sides of the tank, and thus narrowing the sheet as the drawing progresses, but have certain drawbacks which are avoided when the edge rollers are used in combination with the members 6, 6 as heretofore later set forth. When the edge rollers are used alone, a thinning of the sheet occurs inward from the thickened portion 7 (engaged by the rollers) the point of thinning being located inward a substantial distance from the thickened portion at approximately the point indicated by the numeral 8 on Fig. 2. Depending on the length of the rollers 4, 4 and their distance apart, the edge produced may also have a portion of greater thickness than the portion 7 lying between such portion and the thin point above referred to. These conditions of thick and thin produced by the action of the edge rollers, when used alone, tend to cause breakage during the drawing operation, and require that a wider edge be trimmed from the finished sheet than would otherwise be the case. When, on the other hand, the edge rollers are dispensed with, and a holding fork, such as the members 6, 6 is used alone to hold the sheet edge, it is difficult to secure an edge which is not too hard and therefore subject to vents and breakage, and there is a tendency to produce very slight, but optically apparent diagonal waves in the sheet drawn.

The use of the pair of members 6, 6 in conjunction with the edge rollers avoids the foregoing difficulties. The sheet produced has an extreme edge of the thickness determined by the spacing of the rollers 4, 4 preferably slightly thicker than the main body of the sheet, as indicated in Fig. 2, and there is no appreciable thinning of the sheet at 8, which, as above pointed out, occurs when the rollers are used alone. The tendency to breakage incident to thick and thin is thus avoided and wastage, incident to trimming, is reduced as the body of the sheet is suitable for use up to a point closely adjacent the thickened portion 7. The edge produced is somewhat softer than that produced when an edge fork alone is employed and the surface of the sheet is substantially free from the somewhat wavy appearance characteristic of a sheet produced with the edge fork alone.

As indicated in Fig. 3, the pair of members 6, 6 engage the glass rising up to the rollers and the glass 9 between the members 6, 6 and the rollers 4, 4 is drawn by the tractive force of the rollers to a band of thickness which may be varied by varying the distance separating the members, but is always less than this distance. The meniscus of the sheet at its edge is thus modified to give a thickness at 9 which is substantially less than that present when edge holding rolls are used alone.

A sheet with the edge as shown in Fig. 2, can be annealed in an ordinary vertical tower of the Fourcault type. The permissible variations in the thickness at the edge of the sheet depend on the conditions of drawing and annealing and can be ascertained for any given set of conditions only by trial. For this purpose, the form of the edge may be varied by varying the width apart or the position of the pair of members 6, 6 as hereinafter described.

Figs. 4, 5 and 6 show one constructional form of the invention. The rolls 4 are on the shafts 14 running in bearings, of which one is shown at 15, carried on the support 16. The rollers are adjustable in respect to their distance apart and are water or air cooled through the shafts 14. Since the rollers are of well known form, their constructional details are omitted from the drawings. The members 6 are, in this form, the prongs of a fork 17, which passes up between the shafts 14 and is supported on the support 16 by bolts 18.

In an alternative constructional form shown in Figures 7, 8 and 9 the members 6 are each attached to a lug 19 depending from a bar 20. The two bars 20 are fixed to brackets 21, carried on the support 16, by bolts 22, with intermediate distance piece 23. Beyond the distance piece 23, the bars 20 are spaced apart and their spacing can be adjusted by means of the bolt and nut 24. By adjusting the bolt and nut 24, the distance apart of the two members 6 can be adjusted.

An equivalent adjustment can be effected by the simpler construction of Figures 4, 5 and 6. In this, the two members 6 are formed, as at 25, to give a tapering space between them, and the bolts 18 by which the fork 17 is held to the support 16 pass through a slot 26 in the fork. By this means, the fork 17 can be adjusted endwise and, thereby, the average width of the space between the members 6, immediately under the rollers 4 can be varied. This construction, therefore, affords a means for adjusting the effective width of the space between the members, and it also enables, by means of the bolts 18, the height of the members 6 to be adjusted.

By determining the thickness of the glass reaching the rollers, in accordance with the invention, glass is produced having less stress in the neighborhood of the edges. The width of glass which has to be cut to waste off the edges is less, and the operation of drawing is more stable and less affected by temperature variations.

The invention may be applied to drawing apparatus employing width-maintaining rollers, with various forms of accessory devices such, for instance, as the bar 27 (Figure 1) for locating the line of draw in the bath of glass.

Having described my invention, I declare that what I claim and desire to secure by Letters Patent is:—

A process of making a glass sheet which consists in drawing it vertically from a bath, thinning the edge of the sheet by dragging it without chilling through a retarding fork whose glass engaging portions are stationary and located so as to engage the edge of the tapering meniscus of the sheet, but entirely above the bath, and applying rolling traction to the sides of the sheet edge just above said fork at a level at which the edge is still plastic, so as to further thin the edge intermediate the fork and the application of the rolling traction.

JAMES BONAR WATT.